(12) United States Patent
Huang et al.

(10) Patent No.: US 9,445,969 B2
(45) Date of Patent: Sep. 20, 2016

(54) SYSTEMS AND APPARATUS FOR CONTAINER CONVERSION

(71) Applicants: Jiandong Huang, Bellevue, WA (US); Jason Jianzhong Chang, Wuxi (CN)

(72) Inventors: Jiandong Huang, Bellevue, WA (US); Jason Jianzhong Chang, Wuxi (CN)

( * ) Notice: Subject to any disclaimer, the term of this patent is extended or adjusted under 35 U.S.C. 154(b) by 0 days.

(21) Appl. No.: 14/614,166

(22) Filed: Feb. 4, 2015

(65) Prior Publication Data

US 2015/0150759 A1 Jun. 4, 2015

Related U.S. Application Data

(63) Continuation of application No. 13/785,213, filed on Mar. 5, 2013, now Pat. No. 8,963,710.

(51) Int. Cl.
| | |
|---|---|
| *G08B 21/00* | (2006.01) |
| *A61J 1/03* | (2006.01) |
| *G06F 19/00* | (2011.01) |
| *A61J 7/04* | (2006.01) |
| *G01F 17/00* | (2006.01) |

(52) U.S. Cl.
CPC .............. *A61J 1/03* (2013.01); *A61J 7/0481* (2013.01); *G01F 17/00* (2013.01); *G06F 19/3462* (2013.01); *A61J 7/0418* (2015.05); *A61J 7/0436* (2015.05); *A61J 2200/30* (2013.01); *Y10T 29/5313* (2015.01)

(58) Field of Classification Search
CPC ...... A61J 7/0409; A61J 7/041; A61J 7/0472; A61J 7/0481; A61J 7/02; A61J 7/04; A61J 1/03; G06Q 10/10; G06Q 10/109; G06Q 10/1091; B65D 23/00; B65D 25/00; B65D 25/001; B65D 25/00011

USPC ............ 340/540, 545.6, 562, 309.16, 309.7, 340/573.1; 368/10, 107, 109, 188; 705/2, 3
See application file for complete search history.

(56) References Cited

U.S. PATENT DOCUMENTS

| | | | |
|---|---|---|---|
| 4,664,289 A | 5/1987 | Shimizu et al. | |
| 5,012,496 A * | 4/1991 | Weinreb ................ | A61F 9/0008 222/420 |
| 6,084,504 A | 7/2000 | Rosche et al. | |
| 6,271,753 B1 | 8/2001 | Shukla | |
| 6,317,390 B1 | 11/2001 | Cardoza | |
| 7,269,476 B2 | 9/2007 | Ratnakar | |
| 7,754,302 B2 * | 7/2010 | Yamasaki et al. ........... | 428/35.7 |
| 7,877,268 B2 | 1/2011 | Kulkarni | |
| 7,928,835 B1 | 4/2011 | Jovanov et al. | |

(Continued)

OTHER PUBLICATIONS

Adrianne Jeffries, "Smart pill bottle measures meds using touchscreen technology," http://www.theverge.com/2012/10/8/3473218/smart-pill-bottle-adheretech-capacitance, Oct. 8, 2012 (2 pages).

(Continued)

*Primary Examiner* — Hung T Nguyen
(74) *Attorney, Agent, or Firm* — Kristine Elizabeth Matthews

(57) ABSTRACT

Aspects of the present invention relate to systems, methods and apparatus for converting a container into a smart bottle. According to a first aspect of the present invention, a smart-bottle apparatus may comprise a container portion comprising a plurality of individually addressable sensor pairs covering the wall of the container portion. According to a second aspect of the present invention, a smart-bottle apparatus may comprise a container portion comprising a plurality of individually addressable sensor pairs covering a neck portion of the container portion.

3 Claims, 9 Drawing Sheets

(56) References Cited

U.S. PATENT DOCUMENTS

| | | |
|---|---|---|
| 8,269,613 B2 | 9/2012 | Lazar |
| 8,279,076 B2 | 10/2012 | Johnson |
| 2006/0062734 A1* | 3/2006 | Melker et al. ............... 424/10.1 |
| 2006/0139151 A1 | 6/2006 | Rosche |
| 2008/0059226 A1 | 3/2008 | Melker et al. |
| 2009/0294521 A1 | 12/2009 | de la Huerga |
| 2010/0076595 A1 | 3/2010 | Nguyen |
| 2010/0200593 A1 | 8/2010 | Lazar |
| 2010/0220553 A1 | 9/2010 | Nurse et al. |
| 2011/0012742 A1 | 1/2011 | Johnson |
| 2011/0119090 A1 | 5/2011 | Lazar |
| 2012/0239419 A1 | 9/2012 | Allen |
| 2012/0285858 A1 | 11/2012 | Peer et al. |
| 2012/0316897 A1 | 12/2012 | Hanina et al. |
| 2012/0319856 A1 | 12/2012 | Johnson |
| 2013/0222135 A1 | 8/2013 | Stein et al. |
| 2013/0241692 A1* | 9/2013 | Shimizu et al. ............... 340/5.2 |

OTHER PUBLICATIONS

Valentina Palladino, "AdhereTech bottle knows when you take, and miss, your medication," http://www.theverge.com/2014/1/8/5289022/adheretech-smart-pill-bottle, Jan. 8, 2014 (2 pages).

USPTO Office Action—U.S. Appl. No. 13/785,213—Notification Date Aug. 12, 2014.

* cited by examiner

US 9,445,969 B2

SYSTEMS AND APPARATUS FOR CONTAINER CONVERSION

CROSS REFERENCE TO RELATED APPLICATIONS

This application is a continuation application of U.S. patent application Ser. No. 13/785,213, entitled "Systems and Apparatus for Container Conversion," filed on Mar. 05, 2013, U.S. Pat. No. 8,963,710, invented by Jiandong Huang and Jason Jianzhong Chang, said application, U.S. patent application Ser. No. 13/785,213, is hereby incorporated by reference herein, in its entirety.

FIELD OF THE INVENTION

Embodiments of the present invention relate generally to systems and apparatus for container conversion and, in particular, to systems and apparatus for converting a bottle into a smart bottle with monitoring, verification and communication capabilities.

BACKGROUND

Monitoring and verification of patient compliance with a drug regime may be required for a variety of reasons, for example, management of patient care, verification of patient compliance in a clinical trial, correlation of medication consumption with patient symptoms and other reasons requiring detailed medical records of medicine intake by a patient. However, it may be prohibitively expensive to provide trained personnel to personally monitor and verify patient compliance. Therefore, systems and apparatus for providing monitoring and compliance with the drug regime may be desirable. Additionally, systems and apparatus for converting a drug bottle into a smart bottle with monitoring, verification and communication capabilities may further be desirable.

SUMMARY

Some embodiments of the present invention comprise systems and apparatus for container conversion and, in particular, systems and apparatus for converting a bottle into a smart bottle with monitoring, verification and communication capabilities.

According to a first aspect of the present invention, a bottle may be converted into a smart bottle. A tapered plug comprising a channel portion, wherein a first sensor is located proximate to a first end of the channel portion and a second sensor is located proximate to a second end of the channel portion, and a non-channel portion, wherein the non-channel portion houses a processor, a memory, a battery, a power-management system, a clock and a communication interface, may replace a standard container cap, thereby providing monitoring, verification and communication capabilities.

Some embodiments of the present invention comprise systems and apparatus for static mass/volume measurement.

Some embodiments of the present invention comprise systems and apparatus for dynamic mass/volume measurement.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
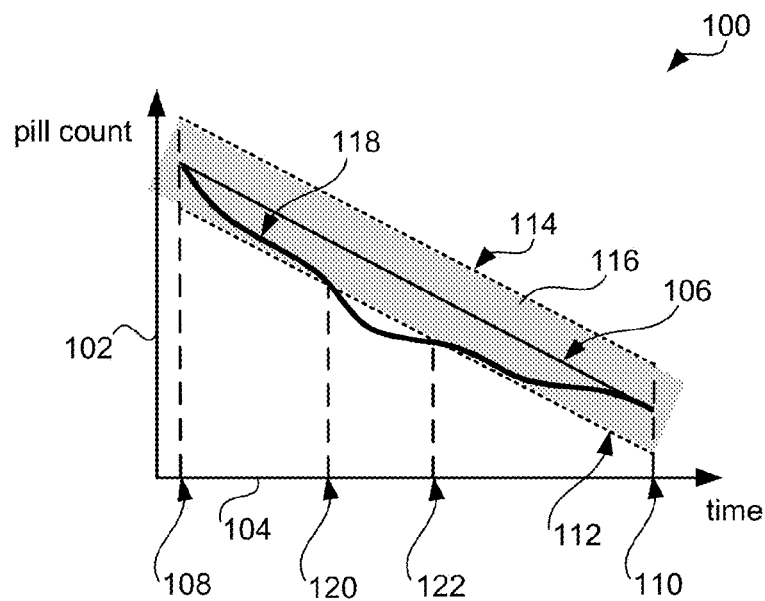
FIG. 1 is a picture illustrating an exemplary drug-protocol compliance scenario.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

Monitoring and verification of patient compliance with a drug regime may be required for a variety of reasons, for example, management of patient care, verification of patient compliance in a clinical trial, correlation of medication consumption with patient symptoms and other reasons requiring detailed medical records of medicine intake by a patient. However, it may be prohibitively expensive to provide trained personnel to personally monitor and verify patient compliance. Therefore, systems and apparatus for providing monitoring and compliance with the drug regime may be desirable. Additionally, systems and apparatus for converting a drug bottle into a smart bottle with monitoring, verification and communication capabilities may further be desirable.

FIG. 1 illustrates an exemplary drug-protocol compliance scenario 100. The graph in FIG. 1 depicts pill count 102 along the vertical axis and time 104 along the horizontal axis. Ideal pill consumption 106 may be indicated by a line segment starting at an initial commencement time 108 and ending at a termination time 110. The initial commencement time 108 may correspond to the time at which a patient may be instructed to commence consumption of a medication, for example, to administer an initial dose. While the termination time 110 may correspond to the time at which the last dose distributed may be administered. Clinical tolerances for under-consumption 112 and over-consumption 114 may be depicted by dashed lines and may correspond to a range 116 of consumption values, over time, that may be in compliance with the drug regime. The heavy, dark line 118 may indicate actual consumption. Time intervals, for example, the time interval between indicator 120 and 122, in which actual consumption 118 falls outside the range 116 of clinical tolerance may indicate violations of the drug regime.

Some embodiments of the present invention comprise systems and apparatus for monitoring and verifying compliance with a drug regime.

Figure 2:
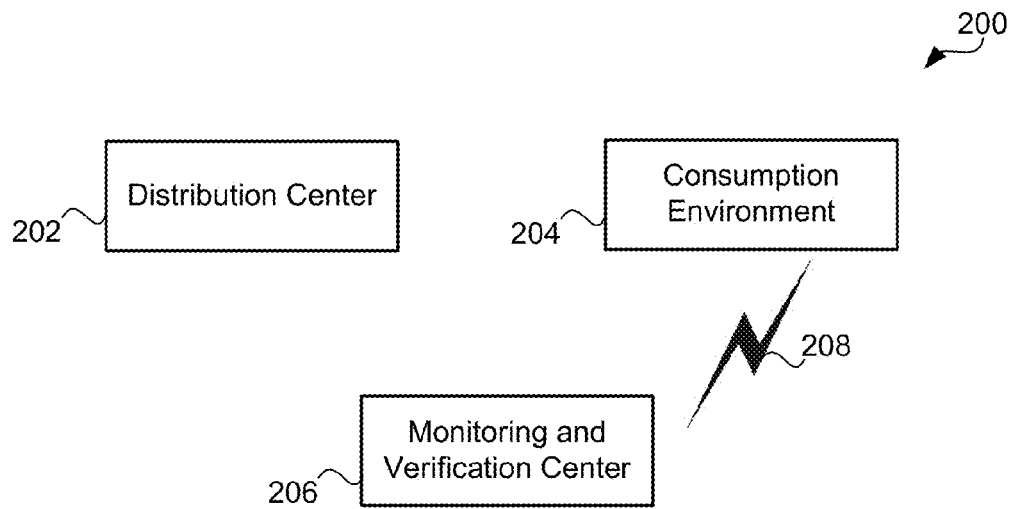
FIG. 2 is a picture illustrating exemplary embodiments of the present invention comprising a distribution center, a consumption environment and a monitoring and verification center.

Some embodiments of the present invention may be understood in relation to FIG. 2. FIG. 2 depicts a system 200 comprising a distribution center 202 for distribution of medication, for example, a medical center, a medical clinic, a pharmacy, a hospital, a clinical research facility and other facilities from which medication may be distributed directly to patients or patient representatives. The system 200 further comprises a consumption environment 204, whereat a patient may consume the distributed medication. The system 200 further comprises a monitoring and verification center 206, whereat consumption information may be evaluated and monitored by the requisite professionals. In some embodiments of the present invention, the consumption environment 204 may be communicatively coupled with the monitoring and verification center 206 via a communication link 208. In some of these embodiments, the communication coupling may be between a smart bottle, wherein the medication may be housed and from which it may be obtained by the patient for consumption, and the monitoring and verification center 206. Exemplary communication links 208 may include a wireless link, a cell-phone-based communication link and other communication links intended for data transmission and communication.

In alternative embodiments, a smart bottle may be transported to a monitoring and verification center in order to download, directly from the smart bottle, consumption information.

Figure 3:
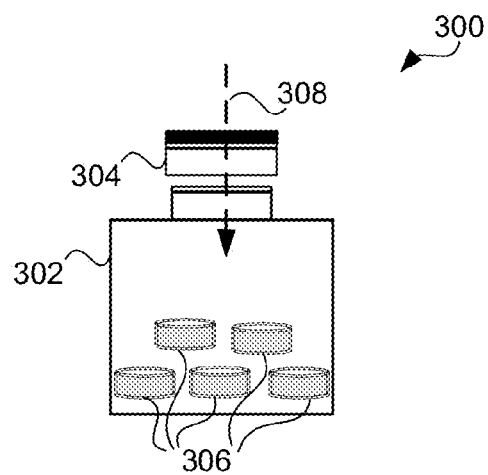
FIG. 3 is a picture illustrating initialization of monitoring and consumption parameters and information in accordance with exemplary embodiments of the present invention.

Some embodiments of the present invention may be further understood in relation to FIG. 2 and FIG. 3. At a distribution center 202, a smart bottle 300, comprising a container portion 302 and a cap portion 304, also considered a lid portion, may be filled with an appropriate amount of medication 306 to sustain a pre-determined interval of time in a drug regime. Monitoring and consumption parameters and information may be reset, input and/or initialized at this time. The monitoring and consumption parameters and information may be stored in a memory within the smart bottle 300. In some embodiments, a clock, within the smart bottle 300, may be initialized. In some embodiments, physical parameters related to the geometry, for example, the radius, the height, the shape and other descriptive parameters, of the container portion 302 of the smart bottle 300 may be initialized. In some embodiments, an initial pill count corresponding to the number of pills initially placed within the smart bottle 300 may be initialized. In some embodiments, a number of doses corresponding to the number of patient doses of medication initially placed within the smart bottle 300 may be initialized. In some embodiments, a description of ideal consumption rate and clinical tolerances may be initialized within the smart bottle 300. In some embodiments, a per pill weight may be initialized within the smart bottle 300. In some embodiments, a per dose weight may be initialized within the smart bottle 300. In some embodiments, an initial volume corresponding to the volume of a liquid medication initially dispensed may be initialized. The above-described monitoring and consumption parameters and information are by way of example and not limitation. The filled smart bottle 300 may be sealed 308. The filled smart bottle 300 may be distributed, to a patient, from the distribution center 202.

Figure 4:
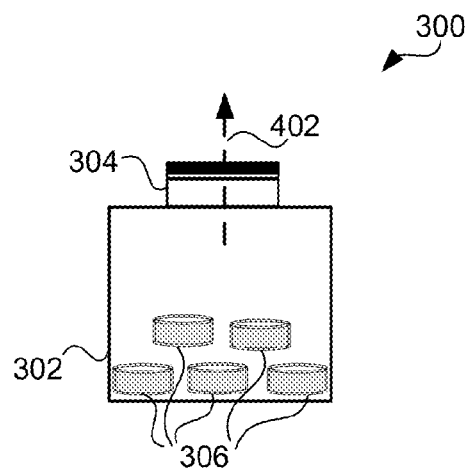
FIG. 4 is a picture illustrating activation of a monitoring and verification process in accordance with exemplary embodiments of the present invention.

Some embodiments of the present invention may be further understood in relation to FIG. 2 and FIG. 4. A patient may activate a monitoring and verification process of the smart bottle 300 by removing 402 the cap portion 304 of the smart bottle 300 from the container portion 302.

Figure 5:
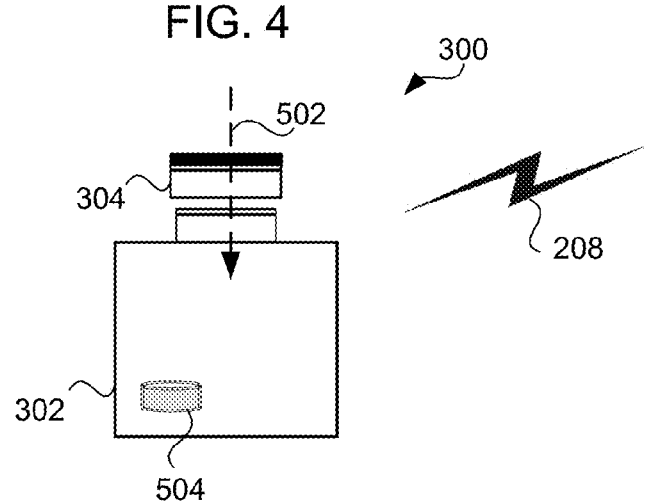
FIG. 5 is a picture illustrating activation of a communication link between a consumption environment and a monitoring and verification center in accordance with exemplary embodiments of the present invention.

Some embodiments of the present invention may be further understood in relation to FIG. 2 and FIG. 5. A patient may activate a communication process of the smart bottle 300 by subsequent replacement 502 of the cap portion 304 of the smart bottle 300 on the container portion 302. Activation of the communication process may comprise activation of the communication link 208 between the consumption environment 204 and the monitoring and verification center 206. Consumption information may be communicated between the smart bottle 300 and the monitoring and verification center 206. The difference between the amount of medication 306 in the smart bottle 300 prior to the removal of the cap portion 304 and the amount of medication 504 in the smart bottle 300 subsequent to the replacement 502 of the cap portion 304 may be considered the amount of medication consumed at a time commensurate with the removal and/or replacement of the cap portion 304 of the smart bottle 300.

Figure 6:
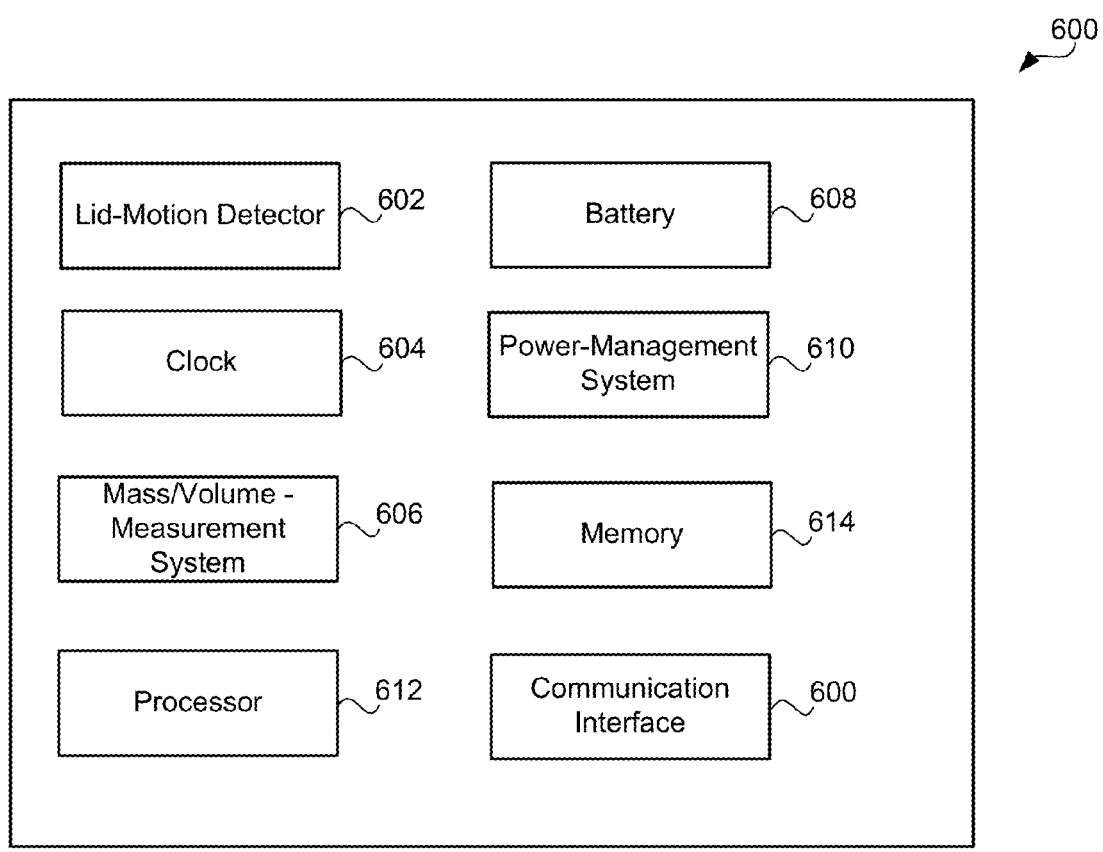
FIG. 6 is a picture illustrating exemplary embodiments of the present invention comprising a smart-bottle system comprising a lid-motion detector, a clock, a mass/volume measurement system, a processor, a battery, a power-management system, a memory and a communication interface.

Some embodiments of the present invention may be described in relation to FIG. 6. A smart-bottle monitoring, verification and communication system 600, also considered a smart-bottle system, integral to a smart bottle may comprise a lid-motion detector 602 for detecting motion of a cap portion of the smart bottle. The lid-motion detector 602 may detect motion of the cap portion of the smart bottle and may determine a motion event, for example, "removal" or "replacement," associated with the lid motion. The smart-bottle system 600 may comprise a clock 604 for providing a time stamp in response to a detected motion event. The clock 604 may be reset, or initialized, at which time the smart bottle is initially filled or refilled. The smart-bottle system 600 may comprise a mass/volume-measurement system 606 for measuring the mass and/or volume of medication within the smart bottle. The smart-bottle system 600 may comprise a battery 608 for providing power to power-consuming portions of the smart-bottle system 600. The smart-bottle system 600 may further comprise a power-management system 610 to efficiently manage the power consumption of the smart-bottle system 600. In some embodiments of the present invention, the power-management system 610 may comprise a wireless charger. In alternative embodiments of the present invention, the power-management system 610 may comprise a wired charger. In some embodiments of the present invention, the power-management system 610 may enter a low-power state based on triggers related to detected lid-motion events. The smart-bottle system 600 may comprise a processor 612 for effectuating computing processes related to lid-motion detection, mass/volume measurement, power management, and other processes related to the smart-bottle system 600. The smart-bottle system 600 may comprise memory 614 for storing measurements, input data, initialization data, system parameters, computer instructions and other data required for the operation of the smart-bottle system 600. The smart-bottle system 600 may comprise a communication interface 616 for receiving input data for initialization and for transmitting consumption information and alerts.

Figure 7:
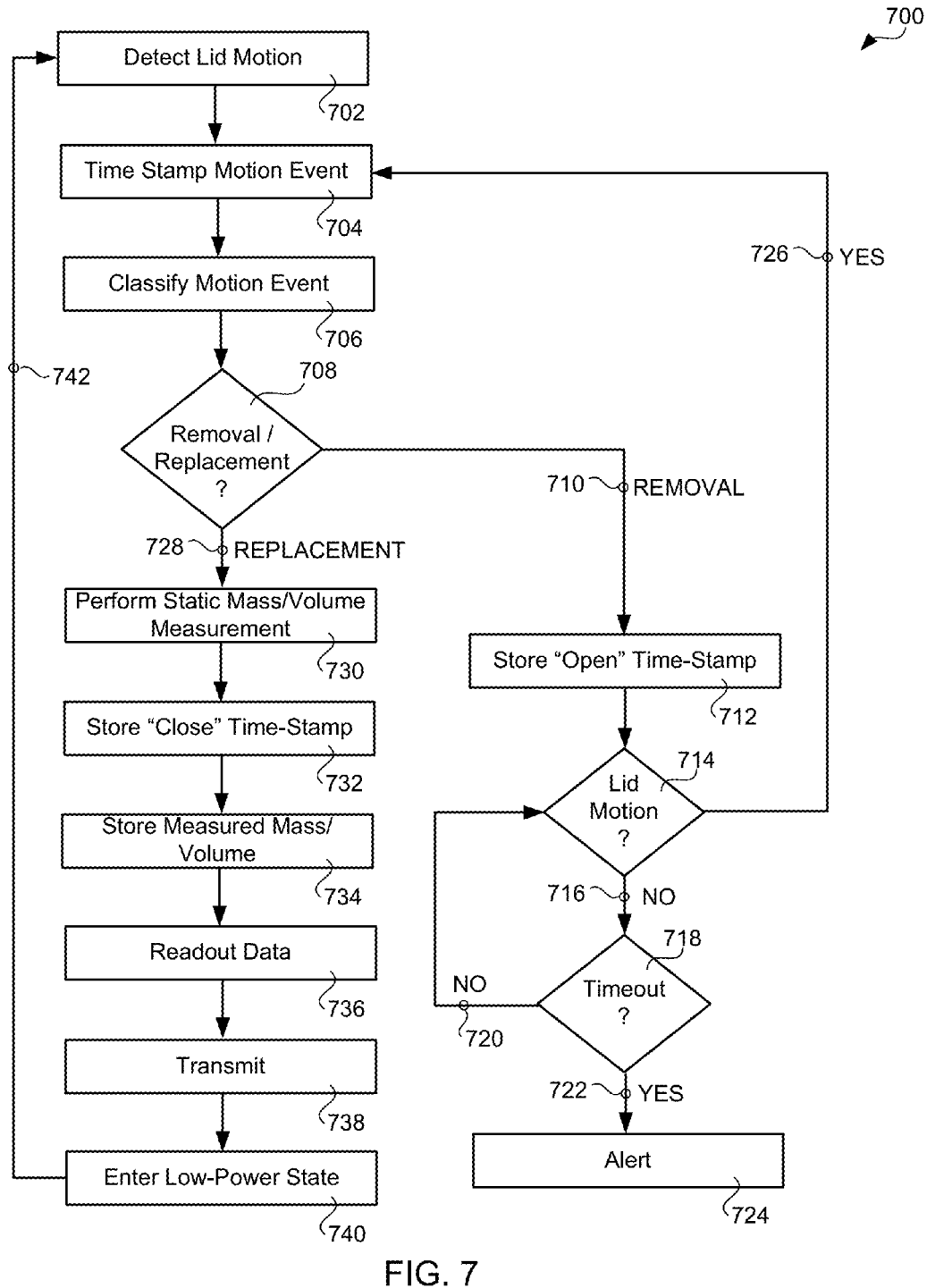
FIG. 7 is a chart showing exemplary embodiments of the present invention comprising a static mass/volume measurement.

Some embodiments of the present invention comprising static mass/volume measurement may be understood in relation to FIG. 7. FIG. 7 depicts exemplary operational method(s) 700 for a smart-bottle system. Lid motion, also considered a motion event, may be detected 702, and a time stamp associated with the lid motion may be obtained 704. The motion event may be classified 706, for example, as a "removal" event in which a cap portion may be removed from a container portion, and a "replacement" event in which the cap portion may be replaced on the container portion. The classified motion event may be examined 708. If the motion event is classified as a "removal" event 710, then the time stamp associated with the lid motion may be stored 712 as an "open" time stamp, or other label indicative of the "removal" event. The system may wait 714 to detect another lid-motion event. If no lid motion is detected 716, then a comparison between the time spent in the wait cycle and a timeout limit may be made 718. If the timeout limit is not exceeded 720, then the wait for lid motion 714 may continue. If the time out limit is exceeded 722, then an alert may be triggered 724. If lid motion is detected 726, the operation may continue by associating a time stamp 704 with the motion event. When a motion event is classified as a "replacement" event 728, a static measurement of the mass and/or volume remaining in the container may be made 730, and the time stamp associated with the lid motion may be stored 732 as a "close" time stamp, or other label indicative of the "replacement" event. The measured mass and/or volume may be stored 734. Data may be readout 736 and transmitted 738. The system may enter 740 a low-power state while waiting 742 for another lid-motion event.

Figure 8:
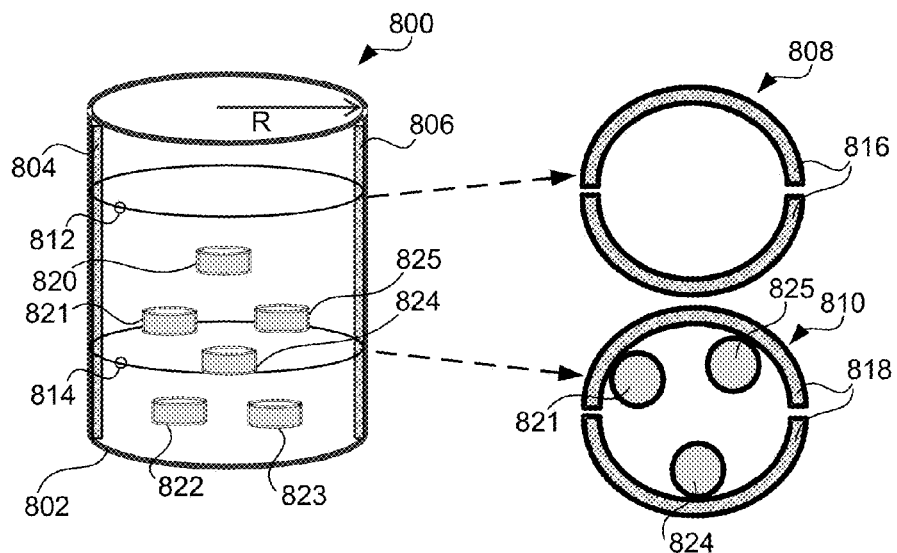
FIG. 8 is a picture illustrating exemplary embodiments of the present invention comprising a static mass/volume measurement based on capacitance measurements of individually addressable half metal ring pairs.

In some embodiments of the present invention described in relation to FIG. 8, a static mass, or volume, measurement may be made based on capacitance measurements. FIG. 8 depicts a first view 800 of a container portion 802 of a smart bottle. The walls 804, 806 of the container portion 802 of the smart bottle may be covered by a plurality of half metal rings that may be individually addressed by one, or more, sampling circuits. Two exemplary cross-sections 808, 810 are depicted in FIG. 8 at two heights 812, 814, respectively, on the container portion 802 of the smart bottle. Each exemplary cross-section 808, 810 may be associated with a corresponding half metal ring pair 816, 818. A capacitance distribution measured by addressing each of the half metal rings may be related to the number of pills (five shown 820-825) in the container. For example, a low capacitance may be measured at cross-section 808, where there are no pills within the cross-section, while a higher capacitance may be measured at cross-section 810, where the cross-section cuts across multiple pills 821, 824, 825. For each ring, a capacitance may be determined according to:

$$C_k = \epsilon_k f(R),$$

where $C_k$ may denote the capacitance of the kth ring, $f(R)$ may be a configuration constant associated with the container geometry and $\epsilon_k$ may be directly correlated to the number of pills in the cross-section of the kth ring. Therefore, the number of pills may be determined at a given time by measuring the individual capacitances at each of the half metal ring pairs.

Figure 9:
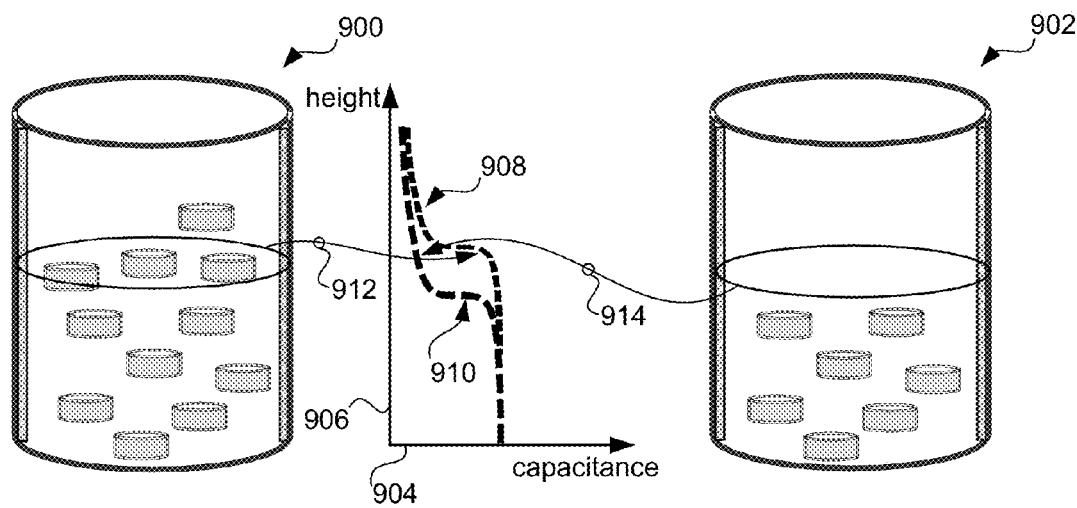
FIG. 9 is a picture illustrating exemplary embodiments of the present invention comprising a static mass/volume measurement based on capacitance measurements of individually addressable half metal ring pairs.

FIG. 9 illustrates the state of a container at a first time 900 and the state of the container at a second time 902. FIG. 9 also illustrates a plot 908, 910 of capacitance 904 versus height 906 for each container state 900, 902, respectively. With the removal of pills between the first time and the second time, the measured capacitance is correspondingly lower at rings located toward the top of the container. For example, at cross-section 912 at the first time, the capacitance is greater than at the corresponding cross-section 914 at the later time after which number of pills within the container has decreased.

Figure 10:
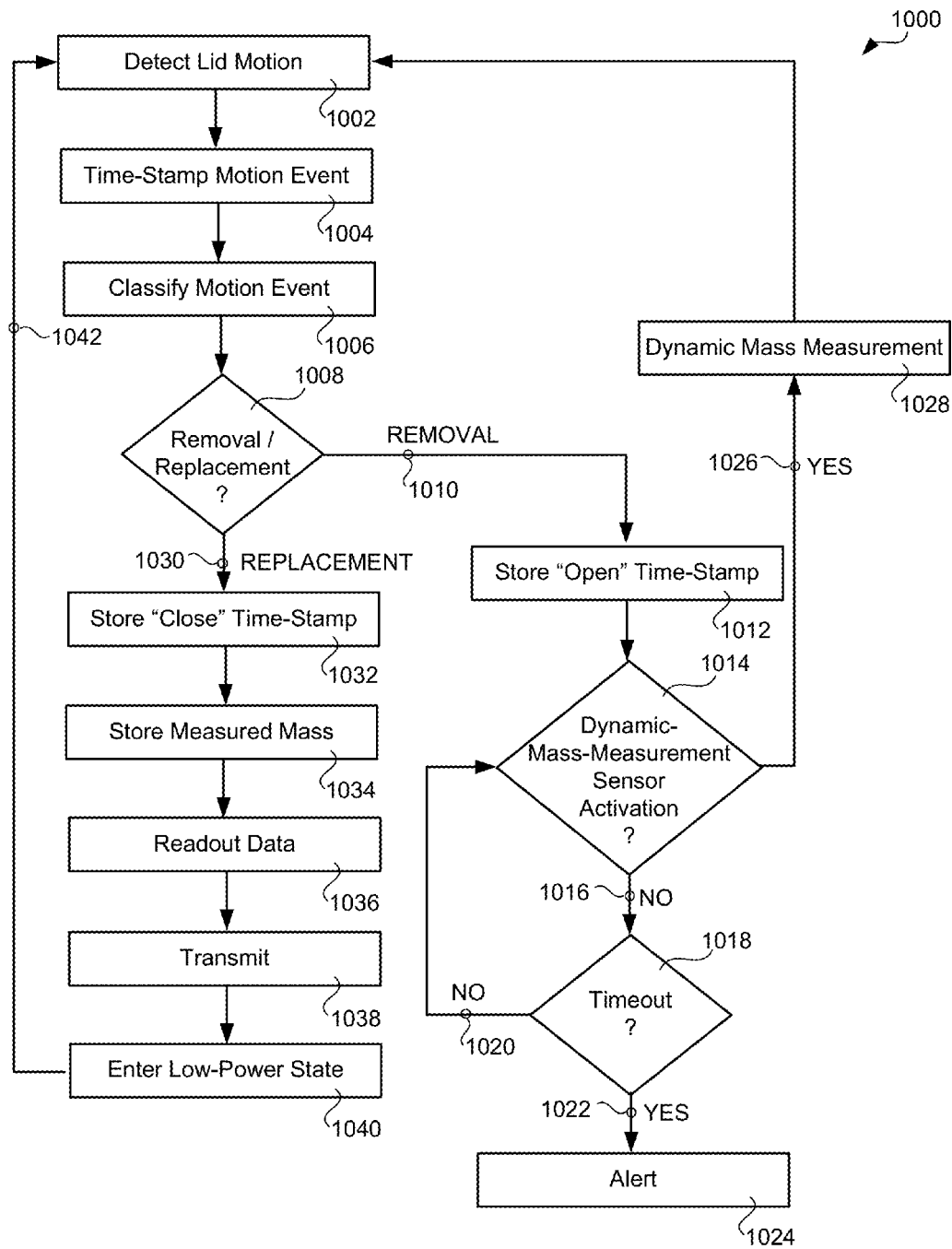
FIG. 10 is a chart showing exemplary embodiments of the present invention comprising a dynamic mass/volume measurement.

Some embodiments of the present invention comprising dynamic mass measurement may be understood in relation to FIG. 10. FIG. 10 depicts exemplary operational method(s) 1000 for a smart-bottle system. Lid motion, also considered a motion event, may be detected 1002, and a time stamp associated with the lid motion may be obtained 1004. The motion event may be classified 1006, for example, as a "removal" event in which a cap portion may be removed from a container portion, and a "replacement" event in which the cap portion may be replaced on the container portion. The classified motion event may be examined 1008. If the motion event is classified as a "removal" event 1010, then the time stamp associated with the lid motion may be stored 1012 as an "open" time stamp, or other label indicative of the "removal" event. The system may wait 1014 for dynamic-mass-measurement sensor activation. If no dynamic-mass-measurement sensor activation is detected 1016, then a comparison between the time spent in the wait cycle and a timeout limit may be made 1018. If the timeout limit is not exceeded 1020, then the wait for dynamic-mass-measurement sensor activation 1014 may continue. If the time out limit is exceeded 1022, then an alert may be triggered 1024. If dynamic-mass-measurement sensor activation is detected 1026, a dynamic mass measurement may be made 1028 and the operation may wait to detect another lid-motion event. When a motion event is classified as a "replacement" event 1030, the time stamp associated with the lid motion may be stored 1032 as a "close" time stamp indicative of the "replacement" event. The measured mass may be stored 1034. Data may be readout 1036 and transmitted 1038. The system may enter 1040 a low-power state while waiting 1042 for another lid-motion event.

Figure 11:
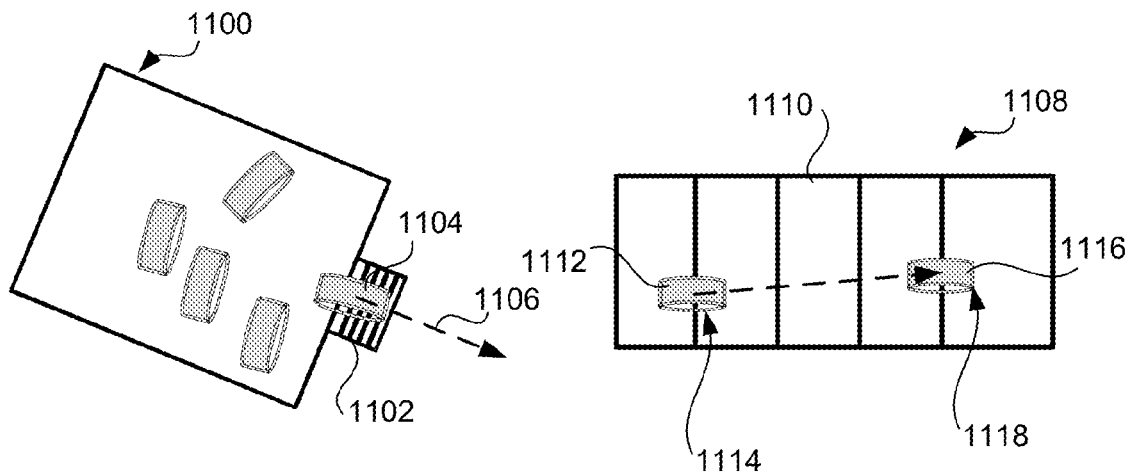
FIG. 11 is a picture illustrating exemplary embodiments of the present invention comprising a sensor array for dynamic mass measurement.
Figure 12:
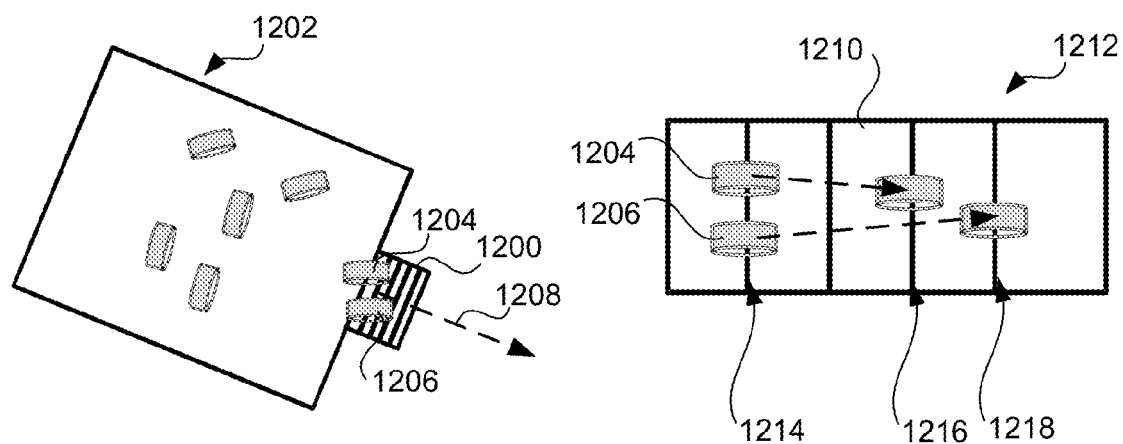
FIG. 12 is a picture illustrating exemplary embodiments of the present invention comprising a sensor array for dynamic mass measurement.
Figure 13:
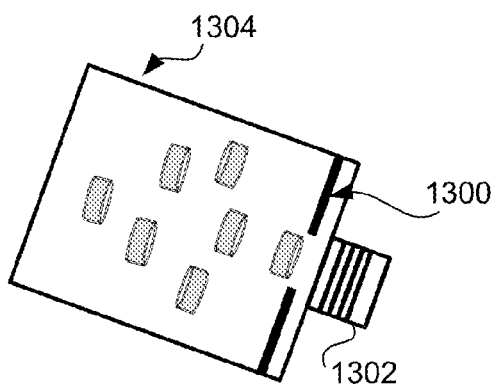
FIG. 13 is a picture illustrating exemplary embodiments of the present invention comprising a mechanical shuffle to prevent simultaneous multiple pill passage through a sensor array.

Dynamic mass measurement according to some embodiments of the present invention may be understood in relation to FIGS. 11-13.

Some embodiments of the present invention may comprise a sensor array housed in the neck of a smart bottle. Detection of pill position along the sensor array in time may determine a direction of movement associated with a pill. FIG. 11 illustrates a smart bottle 1100 comprising a container neck 1102 through which a pill 1104 must traverse 1106. An exploded view 1108 of a sensor array 1110 is also illustrated in FIG. 11. A pill 1112 may be sensed at a first location 1114 on the sensor array 1110. A subsequently sensed pill 1116 may be sensed at a later time at a second location 1118. The relative temporal/spatial relationship between the sensed pill locations may be resolved to determine a direction of motion associated with a pill, and a dynamic measurement of change in pill count within the container 1100 may be made. In some embodiments of the present invention, the sensor array may comprise half metal rings and a capacitance measurement may be used for sensing pill location. In alternative embodiments, a light-emitting diode/photo detector pair may be used to monitor pill motion.

In some embodiments of the present invention described in relation to FIG. 12, the aperture at the neck 1200 of the container 1202 may be large enough to allow multiple pills 1204, 1206 to traverse 1208 the sensor array 1210, shown in an exploded view 1212. Both pills 1204, 1206 may be detected at an initial location 1214 on the sensor array 1210 at an initial time. However, the pills 1204, 1206 may traverse the sensor array at different speeds. For example, a first of the pills 1204 may detected at a second location 1216 at a second time. While a second of the pills 1206 may be detected at a third location 1218 at the second time. In some embodiments of the present invention, tracking methods may be used to resolve pill motion.

In alternative embodiments described in relation to FIG. 13, a mechanical shuffle 1300 may be placed near the neck 1302 of the container 1304 thereby restricting the flow of pills through the sensor array and alleviating the necessity of the tracking processing to resolve ambiguities.

Figure 14:
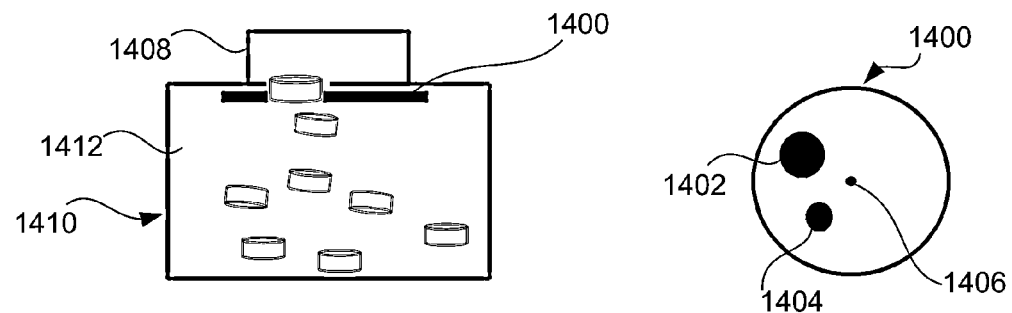
FIG. 14 is a picture illustrating exemplary embodiments of the present invention comprising a size disk.

In alternative embodiments described in relation to FIG. 14, a size disk 1400 comprising a plurality of holes (three shown) 1402, 1404, 1406 of varying sizes may be placed near the neck 1408 of the container 1410. The size disk 1400 may be turned to align the desired hole size with the neck aperture, thereby restricting pill flow through the neck 1408. In some embodiments of the present invention, the size disk 1400 may turn to a closed position upon cap replacement, thereby effectuating a barrier between the neck 1408 of the container 1410 and the main storage compartment 1412 alleviating pill leakage into the main storage compartment 1412, thus ensuring that all pills may be counted.

Figure 15:
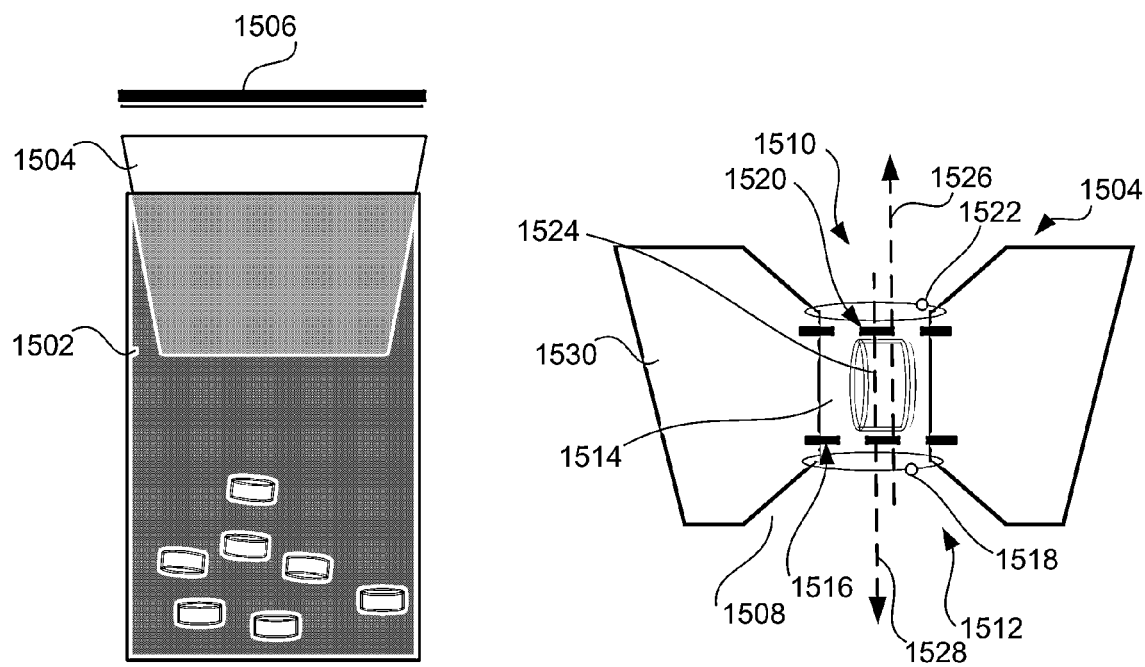
FIG. 15 is a picture illustrating exemplary embodiments of the present invention comprising a tapered plug for converting a bottle into a smart bottle.
Figure 16:
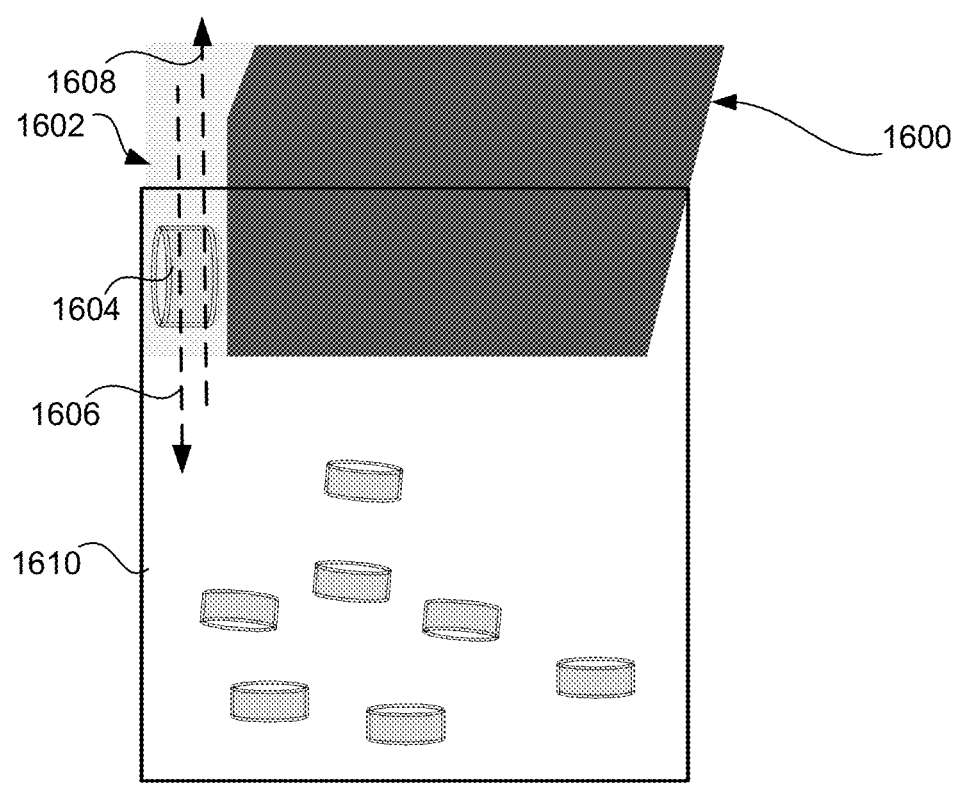
FIG. 16 is a picture illustrating exemplary embodiments of the present invention comprising a tapered plug for converting a bottle into a smart bottle.

Some embodiments of the present invention comprise systems and apparatus for converting a standard pill container, or bottle, into a smart bottle. Exemplary embodiments may be understood in relation to FIG. 15.

Medication may be dispensed in a standard bottle comprising a container Portion 1502 and lid portion (not shown). The container portion 1502 may be retained, while the lid portion may be discarded and replaced with a smart plug 1504 and plug cap 1506. The smart plug 1504 may be embodied in a tapered cylindrical shape allowing the plug to fit within a plurality of different sized container portions. The smart plug 1504 may comprise a channel portion 1508 through the middle, or other portion, of the smart plug 1504. The channel 1508 may comprise a tapered entrance at the top 1510 and bottom 1512 of the smart plug 1504. The channel 1508 may comprise a main channel 1514 that may extend between the tapered entrance at the top 1510 and bottom 1512 of the smart plug 1504. The smart plug may comprise a first sensor 1516 located proximate to one 1518 of the entrances to the main channel 1514 and a second sensor 1520 located proximate to the other 1522 of the entrances to the main channel 1514. The size of the main channel 1514 may be based on the size of medication to be dispensed. In some embodiments, the channel size may be selected to be greater than one times the size of a relevant dimension of the medication 1524, but less than twice the size of the relevant dimension. In some embodiments, the relevant dimension may be the largest dimension of the medication. In alternative embodiments, the relevant dimension may be the smallest dimension of the medication. The relative triggering of the first sensor 1516 and the second sensor 1520 may determine the direction of medication movement. For example, if the first sensor 1516 is triggered prior to the second sensor 1520, then the medication 1524 may be traversing the smart plug 1504 in a direction 1526, whereby the medication 1524 may be "removed" from the container 1502. And, if the second sensor 1520 is triggered prior to the first sensor 1516, then the medication 1524 may be traversing the smart plug 1504 in a direction 1528, whereby the medication 1524 may be "removed" from the container 1502. In some embodiments of the present invention, the non-channel, tapered housing 1530 of the smart plug 1504 may house processing, memory and other components of the smart plug 1504. In some embodiments of the present invention, the components described in relation to FIG. 6 may be embedded in the non-channel portion of tapered housing 1530 of the smart plug 1504.

In some embodiments of the present invention, the first sensor may comprise a first capacitance sensor comprising a first half metal ring pair, and the second sensor may comprise a second capacitance sensor comprising a second half metal ring pair. In alternative embodiments, the first sensor may comprise a first light-emitting-diode/photo-sensor pair, and the second sensor may comprise a second light-emitting-diode/photo-sensor pair.

In alternative embodiments of the present invention, a smart plug 1600 may comprise an edge-through channel 1602 through which a pill 1604 may enter 1606 or exit 1608 a container 1610.

A person of ordinary skill in the art will appreciate that a wide variety of uses may be employed for embodiments of the present inventions described herein. The exemplary embodiments described in relation to medical containers and medication are intended for illustration and not limitation.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A smart-bottle apparatus comprising:
   a processor;
   a battery;
   a power-management system;
   a clock;
   a communication interface;
   a container portion; and
   a memory;
   wherein said container portion comprises a sensor array housed in a neck portion of said container portion;
   wherein said memory comprises non-transitory computer-readable instructions to cause said processor to execute a method;
   wherein said method comprises:
      detecting a motion event;
      generating a time stamp associated with said motion event;
      classifying said motion event;
      when said motion event is classified as a "removal" event,
         storing said time stamp in association with said motion event;
      when said motion event is classified as a "removal" event,
         performing a dynamic mass measurement, thereby producing a mass measurement, wherein said performing a dynamic mass measurement comprises tracking a location of a first pill in said neck portion;
      when said motion event is classified as a "replacement" event,
         storing said time stamp in association with said motion event; and
      when said motion event is classified as a "replacement" event,
         storing said mass measurement.

2. The smart-bottle apparatus as described in claim 1, wherein a first sensor in said sensor array comprises a first half metal ring pair.

3. The smart-bottle apparatus as described in claim 1, wherein a first sensor in said sensor array comprises a first light-emitting-diode/photo-sensor pair.

\* \* \* \* \*